United States Patent
Minka et al.

(10) Patent No.: US 6,594,393 B1
(45) Date of Patent: Jul. 15, 2003

(54) DYNAMIC PROGRAMMING OPERATION WITH SKIP MODE FOR TEXT LINE IMAGE DECODING

(76) Inventors: Thomas P. Minka, 305 Memorial Dr., Cambridge, MA (US) 02139; Dan S. Bloomberg, 1013 Paradise Way, Palo Alto, CA (US) 94306; Ashok C. Popat, 625 Cedar St., Apt. K, San Carlos, CA (US) 94070

( * ) Notice: Subject to any disclaimer, the term of this patent is extended or adjusted under 35 U.S.C. 154(b) by 0 days.

(21) Appl. No.: 09/569,531

(22) Filed: May 12, 2000

(51) Int. Cl.[7] .............................. G06K 9/68; G06K 9/72; G06K 9/36; G10L 15/06; G10L 15/14; G06F 17/30
(52) U.S. Cl. ...................... 382/218; 382/229; 382/233; 704/243; 704/256; 707/6
(58) Field of Search .................................. 382/174, 177, 382/209, 217, 218, 219, 220, 229, 233, 310, 159; 704/242, 243, 256; 707/6

(56) References Cited

U.S. PATENT DOCUMENTS

| | | | |
|---|---|---|---|
| 5,020,112 A | 5/1991 | Chow ......................... 382/226 |
| 5,199,077 A | 3/1993 | Wilcox et al. .............. 704/256 |
| 5,321,773 A | 6/1994 | Kopec et al. ............... 382/209 |
| 5,335,289 A | * 8/1994 | Abdelazim .................. 382/177 |
| 5,390,278 A | * 2/1995 | Gupta et al. ................ 704/243 |
| 5,526,444 A | 6/1996 | Kopec et al. ............... 382/233 |
| 5,537,444 A | * 7/1996 | Nill et al. .................... 375/341 |
| 5,689,620 A | 11/1997 | Kopec et al. ................ 706/12 |
| 5,706,364 A | 1/1998 | Kopec et al. ................ 382/159 |
| 5,883,986 A | 3/1999 | Kopec et al. ................ 382/310 |
| 6,249,604 B1 | * 6/2001 | Huttenlocher et al. ....... 382/174 |

OTHER PUBLICATIONS

Kopec et al, Document–Specific Character Template Estimation, Apr. 1996, SPIE, ISBN: 0–8194–2034, vol. 2660, p. 14–26.*

Mohamed et al, Handwritten Word Recognition Using Segmentation–Free Hidden Markov Modeling and Segmentation–Based Dynamic Programming Techniques, May 1996, PAMI Paper, vol. 18, pp. 548–554.*

\* cited by examiner

*Primary Examiner*—Mehrdad Dastouri

(57) ABSTRACT

In a text recognition system, the computational efficiency of a text line image decoding operation is improved by utilizing the characteristic of a graph known as the cut set. The branches of the data structure that represents the image are initially labeled with estimated scores. When estimated scores are used, the decoding operation must perform iteratively on a text line before producing the best path through the data structure. After each iteration, nodes in the best path are re-scored with actual scores. The decoding operation incorporates an operating mode called skip mode. When the number of consecutive image positions for which the change value of cumulative path scores between current and prior iterations is substantially constant and exceeds a threshold, this signals the presence of a cut set, and the score change value is added to a previously computed path score until a re-scored node is encountered, thereby eliminating the expensive computation of new cumulative path scores at those image positions.

16 Claims, 7 Drawing Sheets

DYNAMIC PROGRAMMING OPERATION WITH SKIP MODE FOR TEXT LINE IMAGE DECODING

CROSS-REFERENCES TO OTHER APPLICATIONS

The subject matter disclosed in this application is related to subject matter disclosed in concurrently filed, commonly-assigned U.S. patent application Ser. No. 09/570,004 entitled "Document Image Decoding Using Text Line Column-Based Heuristic Scoring" and Ser. No. 09/570,730 entitled "Document Image Decoding Using An Integrated Stochastic Language Model." For ease of reference throughout the discussion below, patent application Ser. No. 09/570,004 is referred to as "the concurrently filed Heuristic Scoring disclosure." These disclosures are incorporated by reference herein for all that each teaches as if set out in full.

The subject matter disclosed in this application is also related to subject matter disclosed in U.S. Pat. No. 5,321,773, entitled "Image Recognition Method Using Finite State Networks," and in U.S. Pat. No. 5,526,444, entitled "Document Image Decoding Using Modified Branch-And-Bound Methods." Both of the disclosures of these patents are incorporated by reference herein for all that each teaches as if set out in full.

BACKGROUND OF THE INVENTION

The present invention relates generally to image decoding and image recognition techniques, and in particular to such techniques using stochastic finite state networks such as Markov sources. In particular, the present invention provides a technique for improving the efficiency of decoding text line images using a stochastic finite state network.

Automatic speech recognition systems based on stochastic grammar frameworks such as finite state Markov models are known. Examples are described in U.S. Pat. No. 5,199,077 entitled "Wordspotting For Voice Editing And Indexing", and in reference [2], both of which use hidden Markov models (HMMs). Bracketed numerals identify referenced publications listed in the Appendix of Referenced Documents.

Stochastic grammars have also been applied to document image recognition problems and to text recognition in particular. See, for example, the work of Bose and Kuo, identified in reference [1], and the work of Chen and Wilcox in reference [2] which both use hidden Markov models (HMMs) for word or text line recognition. See also U.S. Pat. No. 5,020,112, issued to P. A. Chou and entitled "Image Recognition Using Two-Dimensional Stochastic Grammars."

U.S. Pat. No. 5,321,773 (hereafter the '773 DID patent), issued to Kopec and Chou, discloses a document recognition technique known as Document Image Decoding (hereafter, DID) that is based on classical communication theory. This work is further discussed in references [2], [4] and [5]. The DID model 800, illustrated in FIG. 7, includes a stochastic message source 810, an imager 811, a channel 812 and a decoder 813. The stochastic message source 810 selects a finite string M from a set of candidate strings according to a prior probability distribution. The imager 811 converts the message into an ideal binary image Q. The channel 812 maps the ideal image into an observed image Z by introducing distortions due to printing and scanning, such as skew, blur and additive noise. Finally, the decoder 813 receives observed image Z and produces an estimate $\hat{M}$ of the original message according to a maximum a posteriori (MAP) decision criterion. Note that in the context of DID, the estimate $\hat{M}$ of the original message is often referred to as the transcription of observed image Z.

The structure of the message source and imager is captured formally by combining their functions into a single composite image source 815, as shown by the dotted lines in FIG. 7. Image source 815 models image generation using a Markov source. A Markov source is a stochastic finite-state automaton that describes the spatial layout and image components that occur in a particular class of document images as a regular grammar, representing these spatial layout and image components as a finite state network. A general Markov source model 820 is depicted in FIG. 8 and comprises a finite state network made up of a set of nodes and a set of directed transitions into each node. There are two distinguished nodes 822 and 824 that indicate initial and final states, respectively. A directed transition t between any two predecessor ($L_t$) and successor ($R_t$) states in the network of FIG. 8 has associated with it a 4-tuple of attributes 826 comprising a character template, Q, a label or message string, m, a transitional probability, $\alpha$, and a two-dimensional integer vector displacement, $\Delta$. The displacement indicates a horizontal distance that is the set width of the template. The set width of a template specifies the horizontal (x-direction) distance on the text line that the template associated with this transition occupies in the image.

U.S. Pat. No. 5,689,620 extended the principles of DID and the use of Markov source models to support the automatic supervised training of a set of character templates in the font of a particular collection or class of documents, thereby enabling the decoding of font-specific documents for which templates are not otherwise easily available. The use of a Markov source model to describe the spatial layout of a 2D document page and the arrangement of image components such as lines, words and character symbols on the page provides a great deal of flexibility for describing a wide variety of document layouts. This flexibility, combined with automatic training of character templates in a specific font, provide a powerful technological advantage in the field of automatic document recognition. DID enables the decoding (recognition) of any type of character symbols in virtually any type and size of font and in any type of 2D spatial layout.

The powerful flexibility offered by the DID system is limited in actual use by the time complexity involved in the decoding process. Decoding involves the search for the path through the finite state network representing the observed image document that is the most likely path that would have produced the observed image. The '773 DID patent discloses that decoding involves finding the best (MAP) path through a three-dimensional (3D) decoding trellis data structure indexed by the nodes of the model and the coordinates of the image plane, starting with the initial state and proceeding to the final state. Decoding is accomplished by a dynamic programming operation, typically implemented as a Viterbi algorithm. A general description of the implementation of the Viterbi algorithm in the context of Document Image Decoding is omitted here and is provided in the discussion of an implementation of the present invention in the Detailed Description below.

The dynamic programming operation used to decode an image involves computing the probability that the template of a transition corresponds to a region of the image to be decoded in the vicinity of the image point. This template-image probability is represented by a template-image matching score that indicates a measurement of the match between a particular template and the image region at the image point. Branches in the decoding trellis are labeled with the matching scores. The size and complexity of the image as defined by the model (i.e., the number of transitions) and the number of templates to be matched are major factors in computation time. Indeed, the time complexity of decoding using a two-dimensional image source model and a dynamic programming operation, is $O(\|\beta\| \times H \times W)$, where $\|\beta\|$ is the number of transitions in the source model and H and W are the image height and width, respectively, in pixels.

There are two factors that influence this complexity. The first is finding the baselines of horizontal text lines. Although decoding computation grows only linearly with image size, in absolute terms it can be prohibitive because, in effect, each row of pixels in the image is evaluated (decoded) as the baseline of a possible horizontal text line. For example, a two-dimensional image of a column of black text represented in a single known font printed on an 8.5×11 inch page of white background and scanned at 300 dpi resolution causes line decoding to occur 3300 times (300 dpi×11 inches).

A second key bottleneck in the implementation of the dynamic programming decoding procedure is the computation of template-image matching scores. A score is the measurement of the match between a template and a 2D region of the image. Each template is matched at each position of a horizontal row of pixels in the image during text line decoding. If there are 100 templates and 1500–2000 x-pixel positions in a line, then each template has to be matched at each x position on the line, requiring a minimum of $10^5$ actual scores for the line. When the position of an actual baseline is not known exactly, each template could be matched at as many as five vertical pixel positions as well. Thus it was estimated that actual template-image matching scoring for each text line in an image required at least $10^6$ image-template scores. In early implementations of DID, this computation was found to far outweigh all other parts of the decoding process.

U.S. Pat. No. 5,526,444 (hereafter, the '444 ICP patent) issued to Kopec, Kam and Chou and entitled "Document Image Decoding Using Modified Branch-And-Bound Methods," discloses several techniques for improving the computational efficiency of decoding using the DID system. The '444 ICP patent disclosed the use of a class of Markov source models called separable Markov models. When a 2D page layout is defined as a separable Markov source model, it may be factored into a product of 1D models that represent horizontal and vertical structure, respectively. The '444 ICP patent further discloses that decoding with a separable model involves finding the best path through the 2D decoding trellis defined by the nodes of the top-level model, some of which are position-constrained, and the vertical dimension of the image. The computational effect of a position constraint is to restrict the decoding lattice for a node to a subset of the image plane, providing significant computational savings when used with standard Viterbi decoding.

The '444 ICP patent further discloses the use of a recursive Markov source. A recursive source is a collection of named sub-sources each of which is similar to a constrained Markov source except that it may include an additional type of transition. A recursive transition is labeled with a transition probability and the name of one of the Markov sub-sources. The interpretation of a recursive transition is that it represents a copy of the named sub-source. Thus, some of the transitions of the top-level vertical model are labeled with horizontal models. One aspect of each of the horizontal models is that every complete path through the model starts at a fixed horizontal position and ends at a fixed horizontal position, effectively reducing decoding to a one-dimensional search for the best path. A second aspect is that the vertical displacement of every complete path in the model is a constant that is independent of the vertical starting position of the path. Thus, the horizontal models describe areas of the image plane that are text lines, and the top-level vertical model with its nodes that are constrained by position defines which rows of pixels in the 2D image are to be considered as potential text lines. The match score for each branch is computed by running the horizontal model (i.e., performing the Viterbi procedure) along the appropriate row of the image. The overall decoding time for a separable model is dominated by the time required to run the horizontal models, that is, to decode individual text lines.

In conjunction with the use of separable models, the '444 ICP patent also discloses a heuristic algorithm called the Iterated Complete Path (hereafter, ICP) algorithm that fits into the framework of the Viterbi decoding procedure utilized by DID but improves on that procedure by focusing on a way to reduce the time required to decode each of the horizontal models, or lines of text. The ICP algorithm disclosed in the '444 ICP patent is an informed best-first search algorithm that is similar to heuristic search and optimization techniques such as branch-and-bound and A* algorithms. During decoding, ICP causes the running of a horizontal model (i.e., computes the actual template-image matching scores) for only a reduced set of transitions into each node, the reduced number of transitions being substantially smaller than the number of all possible transitions into the node. ICP reduces the number of times the horizontal models are run by replacing full Viterbi decoding of most of the horizontal rows of pixels with the computation of a simple upper bound on the score for that row. This upper bound score is developed from a heuristic function. ICP includes two types of parameterized heuristic functions. Additional information about the ICP best-first search algorithm may also be found in reference [6].

In the '444 ICP patent, the use of a finite state model defined as a constrained and recursive Markov source combined with the ICP algorithm allow for particular transitions to be abandoned as not likely to contain the best path, thereby reducing computation time. Full decoding using the longer computation process of computing the template-image matching scores for a full horizontal line is carried out only over a much smaller number of possible transitions, in regions of the image that are expected to include text lines. The reader is directed to the '444 ICP patent for more details about the heuristic scores disclosed therein. In particular, see the discussion in the '444 ICP patent beginning at col. 16 and accompanying FIG. 7 therein, and refer to FIG. 23 for the pseudo code of the procedure that computes the weighted horizontal pixel projection heuristic.

While the invention disclosed in the '444 ICP patent provided a significant improvement in overall decoding time over full Viterbi decoding, document recognition of a single page of single-column text using the DID method still required a commercially impractical amount of time. Experiments reported in the '444 ICP patent (see Table 2), for example, showed a decoding time of over two minutes for a full page, single column of text. This time is largely taken up by performing full Viterbi decoding on the individual horizontal text lines, when actual template-image matching scores are computed to replace the heuristic scores. Consider that a full page (8½×11 inch) text document image scanned at 300 dpi (spots per inch) results in 3300 horizontal rows of pixels. Even if the ICP method reduced decoding of horizontal lines by a factor of two-thirds as suggested by the reported illustration, that would still result in over 1000 horizontal lines of decoding, requiring upwards of $10^6$ actual template-image matching scores per line. The improvements provided by the technical advances disclosed in the '444 ICP patent, while significant, did not address the efficient decoding of an individual text line. Additional reductions in the decoding time of individual text lines, while still maintaining the overall theoretical framework of the DID method, are desirable.

In the concurrently filed Heuristic Scoring disclosure, reductions in the decoding time of individual text lines were achieved by initially computing and using column-based, upper-bound template-image scores, referred to as heuristic scores, on the branches of the decoding trellis. Use of upper bound heuristic scores, in turn, resulted in the need for the dynamic programming operation to iterate the decoding of a text line. After a decoding iteration, the actual template-image matching scores were computed for the incoming branches of the nodes that were found to be on the estimated best path for that iteration. Decoding the text line was repeated until all heuristic scores for incoming branches to the nodes on the best path had been replaced by actual template-image matching scores. Thus, actual template-image matching scores, which are computationally expensive to produce relative to the upper bound heuristic scores, were computed only as needed. However, some of the computational efficiency achieved through the use of the column-based upper bound heuristic scores was offset by the need for additional iterations of decoding the text line. Because the heuristic scores as designed provide very good upper bound scores, the offset in computational efficiency that results from the additional text line decoding iterations is acceptably small in view of the efficiency gained by the use of the simpler computations involved in column-based heuristic scoring. Thus, there is a balance to be maintained between the efficiencies gained from using simpler scoring methods and the efficiency lost by the resulting increase in the number of iterations of the dynamic programming process. It is desirable, therefore, to improve the operation of the dynamic programming process when decoding individual text lines in order to achieve still further reductions in text line image decoding time.

SUMMARY OF THE INVENTION

The present invention is motivated by the experimental results and observations of the decoding of a text line image when upper bound column-based template-image matching scores, referred to herein as heuristic scores, are used during decoding. Specifically, the fact that the decoding operation must perform several decoding iterations on a text line before a final transcription is produced leads to several observations. The computationally expensive part of each decoding iteration is the computation of the maximum cumulative path score for a given image position. When a decoding iteration is complete, a post-line-decoding operation computes actual template-image matching scores for the templates that are associated with the branches into the nodes that are on the current estimated best path, and replaces the upper bound scores on the branches in the decoding trellis with these actual scores. The next iteration typically produces an estimated best path containing some nodes and branches that differ from the best path of the iteration before, as a result of using actual template-image matching scores in place of the upper bound scores. The decoding iterations produce an estimated path that converges to a maximum likelihood path as more actual template-image matching scores are used in the decoding trellis.

The modification to the decoding operation that forms the basis of the present invention is premised on the observation that results from a prior iteration of decoding may provide useful information to the decoder during the current decoding iteration. In particular, it is known that the values of the scores data on the decoding trellis that are input to the current decoding iteration change from their values during the last iteration only at nodes where one or more preceding branches on the prior estimated best path have just been re-scored. This means that it would be reasonable to expect that, in the current iteration, the cumulative path scores might change in the area of the text line where the re-scoring occurred, since an actual score is now an input to the cumulative path score computations. These newly computed cumulative path scores may cause new nodes to be selected as part of the estimated best path during the backtracing process of the current iteration. However, it does not necessarily follow that this would result in every case. That is, it may also be reasonable to expect that the effect of a re-scored node on the locations of subsequent nodes on the path may be local to the portion of the line where it occurs. The locations of nodes in other image areas of the best path may not change between first and second iterations if no re-scoring of branches on the trellis occurred in those image areas.

This observation makes use of a characteristic of graph theory known as a cut set. A cut set is a subset of the nodes that separate two parts of the graph in a manner such that the only connections between the two separate parts must go through the cut set. A sequence of nodes which spans the maximum set width of a character template forms a cut set in the trellis. Once the change value in the cumulative path score between current and prior decoding iterations as a result of the earlier re-scored branch has been found to be constant for a sufficient number of image positions, the constant change value is guaranteed to be constant at least until the next re-scored branch is encountered, and all subsequent image positions until that point are included in the cut set.

The improved decoding operation disclosed herein exploits the possibility of such local changes by skipping the computation of new cumulative path scores when it is determined that the local change conditions are met. That is, when it is determined that the change in the new cumulative path score that results from the re-scored branch at a given image position is observed to be the same for a sequence of image positions greater than the maximum set width of the character templates, the decoder simply adopts as the current path scores for subsequent image positions the prior cumulative path scores plus the change amount, until another re-scored branch is encountered. This reduces the number of image positions on the text line at which a cumulative path score must be computed, and so reduces the additional computational overhead that results from iterating the decoding process.

This new operating mode is referred to as skip mode. Information about scores and nodes produced by the decoder as a result of at least one complete prior decoding iteration is stored, including a record of the score of the best incoming branch at each node. Skip mode processing tracks the change in a cumulative score produced by a re-scored branch in the trellis that occurred as a result of the just prior iteration. If the change in score is constant for a length of image positions greater than the maximum set width of a character template, then the decoder propagates the score change to the best cumulative scores in the following image positions, until the next incoming re-scored branch is encountered, using best incoming branch scores at these nodes that are maintained from the previous iteration. Skip mode processing achieves significant decoding efficiencies as decoding progresses. After the first iteration of decoding, subsequent decoding iterations begin with the skip mode setting on, and, as the nodes for the first part of the text line remain unchanged from iteration to iteration, more and more of the text line is processed in skip mode.

Note that there may be some operating environments where it is not strictly necessary to require that the change in cumulative path score be a fixed constant amount for a certain number of image positions in order to turn skip mode processing on. The change in cumulative path score could be substantially constant; that is, the change could be within a small range, say a very small percentage of the total cumulative score. So, for example, where a total cumulative path score is in the 100,000 range, the change in the cumulative path score might deviate from a constant change by 10 or less and still be acceptable for measuring whether skip mode processing should be turned on. The proper range would depend on the computational environment, and those of skill in the art will appreciate that the smaller the acceptable deviation from a constant is, the more likely will be the accuracy and stability of the final decoding outcome.

The decoding technique of the present invention may be used in any text line decoder that uses as input a stochastic finite state network that models the document image layout of the document image being decoded, and that requires iteration of the decoding operation because the template-image matching scores labeled on the branches of the decoding trellis are estimated or changing scores. It may be used in simple text line decoders, as well as in the two-dimensional DID method of image recognition disclosed in the patents cited above.

Moreover, the skip mode decoding operation of the present invention has broader use in a wide variety of computational environments that has these operational characteristics: (i) the problem being solved involves using a dynamic programming operation and a data structure representation of the problem in the form of a trellis, trellis-like or graph data structure, where the dynamic programming operation produces cumulative scores as an output from which a path through the graph or trellis may be derived; and (ii) the scores labeled on the branches in the decoding data structure are estimated or changing scores that vary over time during decoding. Situations in which the present invention may be used are in contrast to traditional dynamic programming operations where the scores on the branches are fixed scores and do not vary during decoding. In the case of DID, these scores may be the upper-bound template-image matching scores discussed in the concurrently filed Heuristic Scoring disclosure, or they may be estimated scores for some other reason.

Therefore, in accordance with one aspect of the present invention, a method is provided for operating a processor-controlled machine to decode a text line image. The method comprises, while a skip mode switch is off, for each image position in the text line image, a first computing step of computing a maximum cumulative score indicating a measurement of a match between a sequence of character templates and an image region in the text line image from a starting location of the text line image to the image position. The method then comprises a second computing step of computing a score change value between the maximum cumulative score and a prior maximum cumulative score computed at the image position, and then comparing the score change value to a prior score change value and turning the skip mode switch on when the score change value is substantially constant for at least a predetermined number of consecutive image positions in the text line image. The method further comprises, while the skip mode switch is on, for each image position in the text line image, a third computing step of computing the maximum cumulative score by adding the score change value to a prior maximum cumulative score computed at the image position. The method then comprises producing a transcription of the text line image using the maximum cumulative scores.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

DETAILED DESCRIPTION OF THE INVENTION

1. General Overview of the Dynamic Programming Operation

Figure 1:
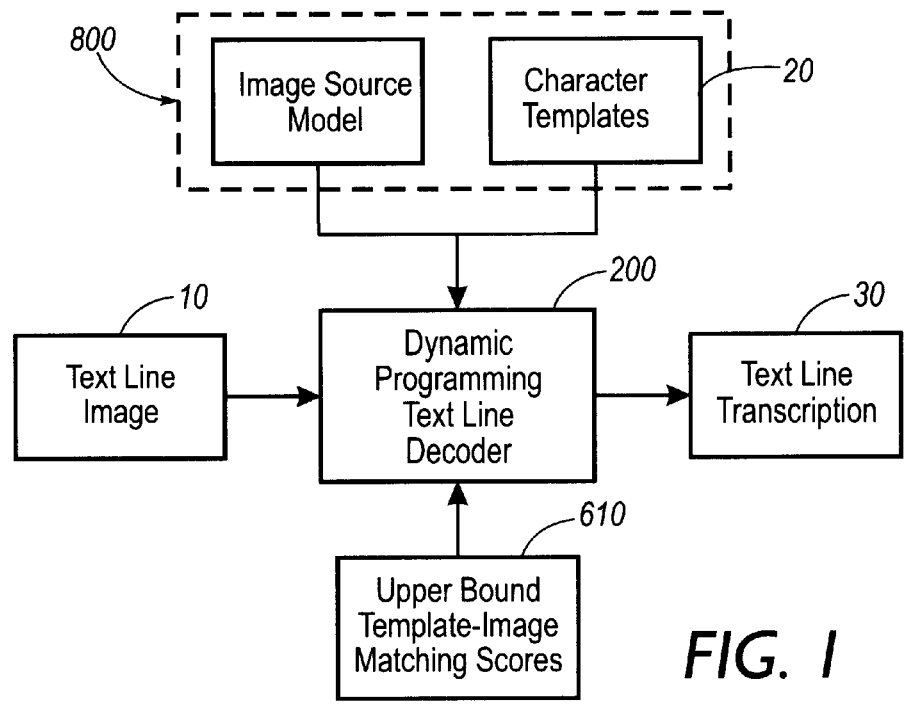
FIG. 1 is a block diagram of the input and output data structures that illustrate the general operation of the text line image decoder of the present invention.
Figure 2:
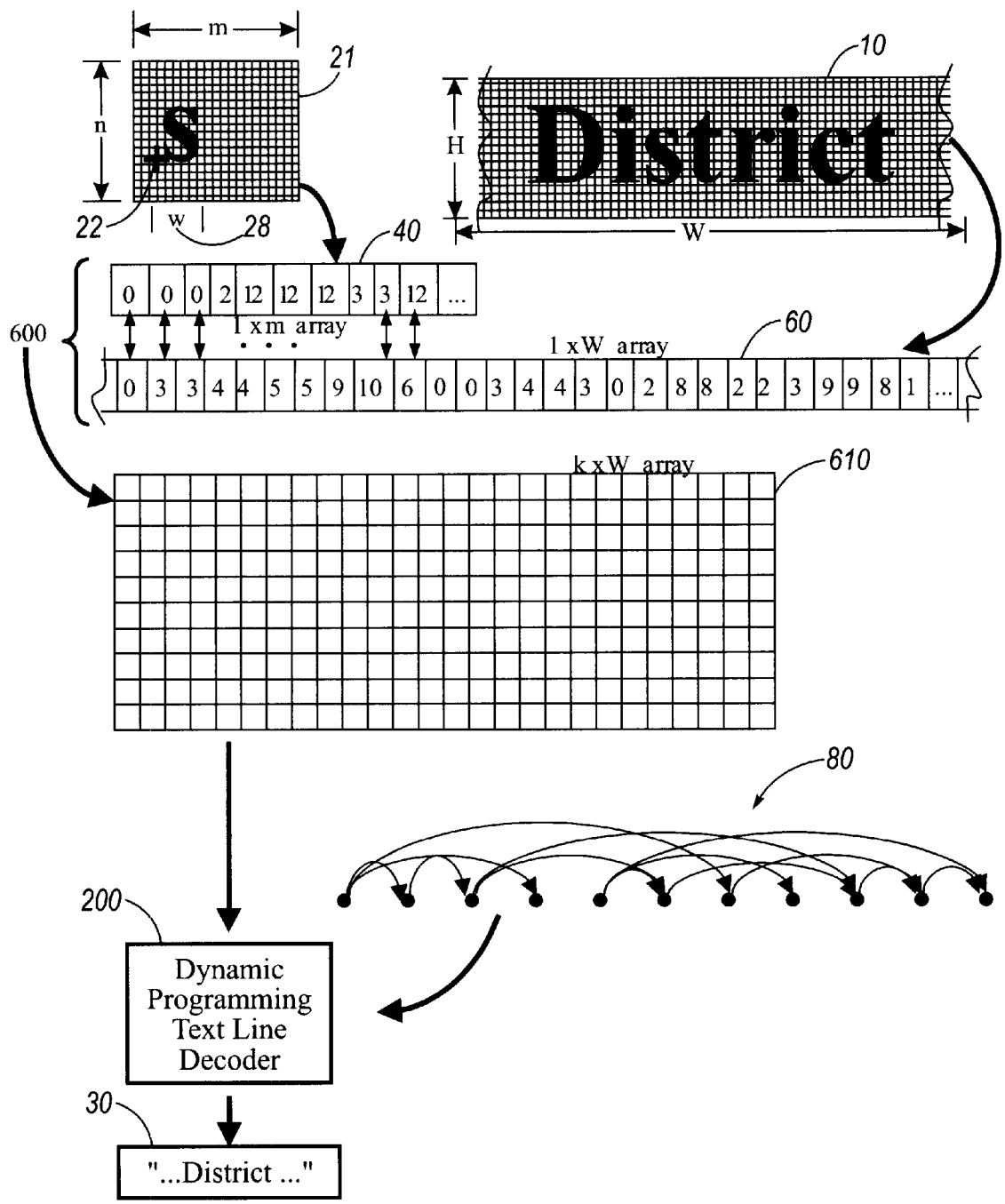
FIG. 2 is a schematic illustration showing the major input and output data structures of FIG. 1, and showing production of heuristic scores for use by the text line image decoder of the present invention.

FIG. 1 is a block diagram illustrating the input and output data structures of the text line decoder 200 of the present invention. FIG. 2 is a schematic illustration of the data structures of FIG. 1. In FIG. 1, image source model 800 represents the spatial layout of a class of single text line images as a stochastic finite state network, and is an input to operation 200. Stochastic image models have been described elsewhere in the patent literature. For convenience, more information about the attributes, characteristics and operation of model 800 may be found in Section 3 below.

Model 800 includes a library 20 of character templates. FIG. 2 shows character template 21, a representative example of library 20 of character template data structures of the type used by the present invention. Each template data structure, such as template 21, indicates a bitmapped image of a character and a character label (not shown) identifying the character. A character label typically uniquely identifies a character in the character set used in the document text, but may also indicate some other information that uniquely identifies the particular template, or may additionally contain font identifying information, size, or type style information. As shown in FIG. 2, each template has dimensions m×n pixels, has an origin point illustrated in template 20 by crossbar 27, and a set width 28 labeled for further reference as set width w. The template origin is designated at the same location within each template. The illustration of character templates in FIG. 2 as 2D arrays of pixels is not intended to limit the type of data structure that may represent a template of the type suitable for use in the present invention. A template may be constructed from the concatenation of pieces of bitmapped characters, such as vertical strokes, joins, ascenders, descenders and curved portions. A template may also be represented by a formal model that produces as its output an explicit 2D array of pixels representing a complete character template.

The support or foreground of a bitmapped character template is the set of pixel locations where the template differs from the background. In documents containing black text on white background, the template support is the set of black ("ON") template pixels. Thus, reference is made herein to black foreground pixels and white ("OFF") background pixels for consistency with this convention, but it is understood that character templates may be defined as having foreground pixels in colors other than black, or may be "reverse video" templates indicating white text on a black background. In recent implementations of document recognition using DID methods, the support and background areas of templates are separated into distinct levels and assigned different image occurrence probabilities. A template in which the support and background areas are separated into two distinct levels, one level for the black foreground pixels and one level for the white background pixels, is referred to herein by the term bi-level template, indicating a maximum of two pixel levels. Bi-level templates are distinguishable from a multi-level template that includes two or more levels of black foreground pixels, indicating different probabilities of occurrence for some black foreground pixels. For purposes of this discussion, the templates in template library 20 may be considered to be any one of standard (in which the background and foreground levels have not been separated), bi-level templates or multi-level templates. Additional information about the various types of character templates may be found in the concurrently filed Heuristic Scoring disclosure. Bi-level and multi-level templates are also discussed in U.S. Pat. No. 5,689,620, entitled "Automatic Training of Character Templates Using a Transcription and a Two-Dimensional Image Source Model". The disclosure about character templates in U.S. Pat. No. 5,689,620 at columns 25–26, lines 12–67 and 1–6, respectively, is hereby incorporated by reference for all that it teaches. Multi-level templates are also described in U.S. Pat. No. 5,706,364, in the discussion accompanying FIGS. 19 and 20 at col. 34≧36.

In FIG. 1, text line image 10 is shown an input to operation 200, and is the image to be decoded. Text line image 10 is an image in the class of documents described by Markov source 800, and includes character images, also referred to as image glyphs. The term glyph as used herein is a single instance, or example, of a character that is realized in an image. FIG. 2 shows a magnified portion of text line image 10 having dimensions W×H with an origin at the upper left corner where y=x=0 in an x, y coordinate system. Assume for purposes of illustration that image 10 has been scanned at 300 dpi and includes just a single line 12 of English language glyphs printed in 12 point Times New Roman font.

With continuing reference to FIG. 1 and FIG. 2, dynamic programming decoding operation 200 produces as output a transcription 30 of the image glyphs in text line image 10. By way of example, FIG. 2 shows transcription 30 of input image portion 10. Decoding is accomplished according to the present invention by using a standard dynamic programming operation modified according to the techniques described below. In the implementation illustrated herein, decoding a text line includes executing the two-dimensional form of a segmental Viterbi algorithm to compute a set of recursively-defined likelihood functions at each point of the image plane, as described in the referenced '444 ICP patent and in U.S. Pat. No. 5,321,773, and further as modified by techniques illustrated in FIG. 4 and FIG. 6. Array 610 of heuristic column-based scores, or some other form of estimated scores, are initially used in place of actual template-image matching scores.

Figure 7:
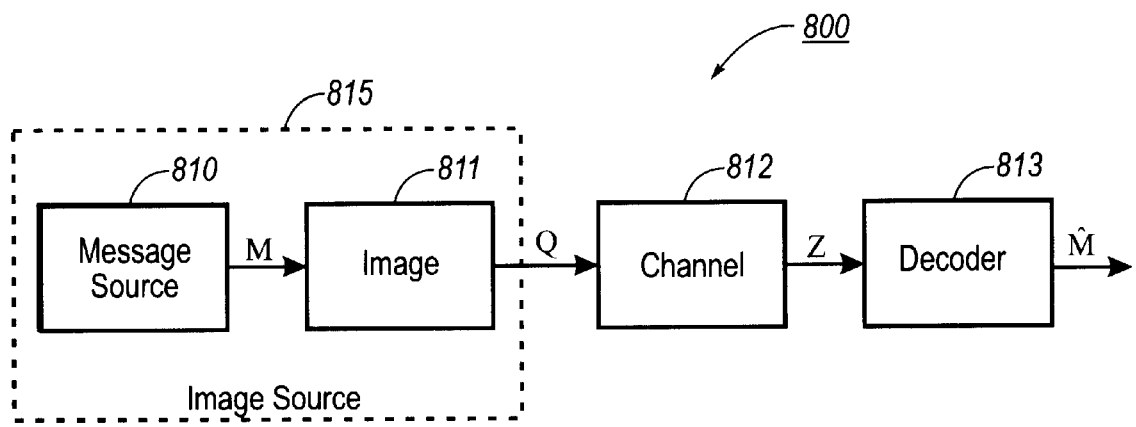
FIG. 7 is a block diagram illustrating the document recognition problem according to classical communications theory, which provides the framework for understanding the context of the technique of the present invention.
Figure 8:
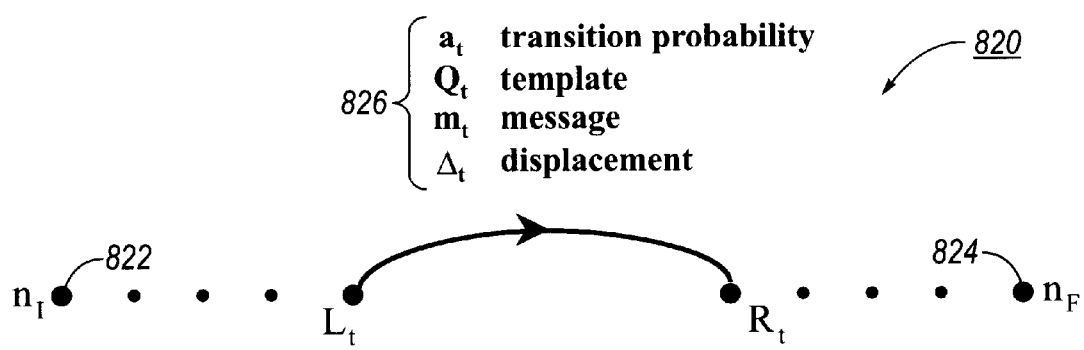
FIG. 8 is a schematic illustration of a general Markov source model that models a text image as a stochastic finite-state grammar represented as a network of nodes and transitions into the nodes.

The use of a dynamic programming operation for decoding is best understood in the context of the general DID framework of FIG. 7. In the DID framework, text line image 10, the image to be decoded, is referred to as observed image Z. There is a set of probabilities in the image model that are derived from channel model 812. Decoder 813 looks for the most likely observed image Z that could have come from the ideal image Q, given channel model 812. Observed image Z is represented by a path through image model 815, which is represented as a decoding trellis indexed by the nodes of the image model and the coordinates of the image plane. Decoding involves finding the best path through the decoding trellis. Decoding trellis 80 in FIG. 2 is intended to be a schematic representation of such a decoding trellis for a text line image. A node is a (state, location) pair, and, for one-dimensional decoding trellis 80, nodes are uniquely defined by x location. The branches taken through the trellis determine the characters in the transcription output; that is, transcription M̂ is formed from the character labels identifying the templates associated with the branches in the path. Based on channel model 812, there is a certain probability distribution over a corrupted image. The probability distribution predicts certain images with certain probabilities. Decoding observed image Z involves computing a set of recursively-defined likelihood functions at each point of the image plane. The likelihood functions indicate the probability distribution evaluated on the specific set of data that is the observed image Z. Each individual node computation computes the probability that the template of a transition corresponds to a region of the image to be decoded in the vicinity of the image point. This template-image probability is represented by a template-image matching score that indicates a measurement of the match between a particular template and the image region at the image point. Thus, a branch of the trellis for a given character template at a given image position is labeled with the template-image matching score for that character at that image position. Producing maximum cumulative path scores at each image position using the template-image matching scores is a way of building up the likelihood in a piece by piece fashion. In terms of the decoding trellis that represents the image model, the template-image matching scores labeling the branches in the trellis are the likelihood terms.

The forward phase of the Viterbi procedure involves identifying, for each pixel position in the image, the most likely path for arriving at that position, from among the paths generated by the printing of each character template and by using the most likely paths for arriving at all previously computed positions. In effect, the recursive Viterbi procedure involves iterating over each image position and each transition into every node and computing the likelihood of the best path that terminates at the node and image position after passing through the transition. The Viterbi decoder produces a cumulative node score array and a backpointer array for each node of the image network. The score for the node contains a numerical match score for that node aligned at each location in the image. The backpointer array for a node identifies the most likely branch into the node among all branches that enter the node, that is, the branch at each image location that maximizes the score.

The Viterbi procedure is carried out in the forward direction until the end-point of the best path is unambiguously identified. The backward phase of the Viterbi involves backtracing through the nodes identified as part of the best path to trace out the actual best path. The nodes on the best path determine the locations of the characters. The sequence of character templates associated with the transitions between each node from the start to the final node in the source model on the best path are concatenated to form the message, or transcription, of the decoded image. U.S. Pat. No. 5,526,444 discloses a more detailed description of the decoding process at cols. 7–9 and the description accompanying FIGS. 19–22 therein.

The modified "skip mode" dynamic programming operation of the present invention operates in any situation where the template-image matching scores labeled on the branches in the decoding trellis are estimated or changing scores, as opposed to fixed, actual template-image matching scores. In the illustrated embodiment described herein, the branches of the decoding trellis are labeled with the heuristic score from heuristic score array 610 in FIG. 2. Heuristic score array 610 is an array of upper bound template-image matching scores having dimensions kxW, where k is the total number of templates in the source model (i.e., the total number of character templates in template library 20), and W is the width of the image text line, or portion thereof, being decoded. Heuristic score array 610 contains a score for each character template at each pixel position, $x_i$, of horizontal text line image 10. The score indicates a measurement of the match between the template and the observed image at pixel position $x_i$.

The column-based heuristic scores of array 610 are produced using data structures that indicate information about counts of ON foreground pixels in columns of the image and the templates. Operation 200 may use scores computed according to various formulas as described in the concurrently filed Heuristic Scoring disclosure. The column-based heuristic scores are upper bound scores for the actual template-image matching scores. As noted in the concurrently filed Heuristic Scoring disclosure, upper bound heuristic scores of the type used by the decoder of the present invention are more efficient to compute than the actual template-image matching scores used by the decoder in previous implementations. In a typical implementation, the column-based heuristic scores of array 610 are computed prior to the actual decoding of a text line.

By way of example, FIG. 2 shows image column array 60 and a set of template column arrays of the type illustrated by data structure 40, each of which indicates a count of foreground pixels in columns of text image 10 and the library 20 of character templates, respectively. This example assumes that the character templates in library 230 are either standard or bi-level templates. To produce upper bound heuristic score $S_{k(i)}$ in array 610 indicating the heuristic score for pixel position $x_i$ in the text line image, the entries in each template column array are compared entry by entry to the same number of consecutive entries in image column array 60 beginning at an initial array element in array 60. This effectively compares column pixel counts in a template with column pixel counts in the observed image for the width of a character template. FIG. 2 uses lines with double arrows between template column array 40 and the set of array entries in image column array 60 to represent this comparison. The minimum of each pair of compared entries is taken and added to a running sum indicating the score for that template. The final template score from all sums of the minima becomes the entry $S_{k(i)}$ in score array 610. Each template column array in the set 40 of arrays is compared in like manner with the set of array entries in image column array 60 beginning with the initial entry. Note that the concurrently filed Heuristic Scoring disclosure describes other methods for computing heuristic scores, including a method for multi-level templates.

2. Operation of the Modified Dynamic Programming Operation

Figure 3:
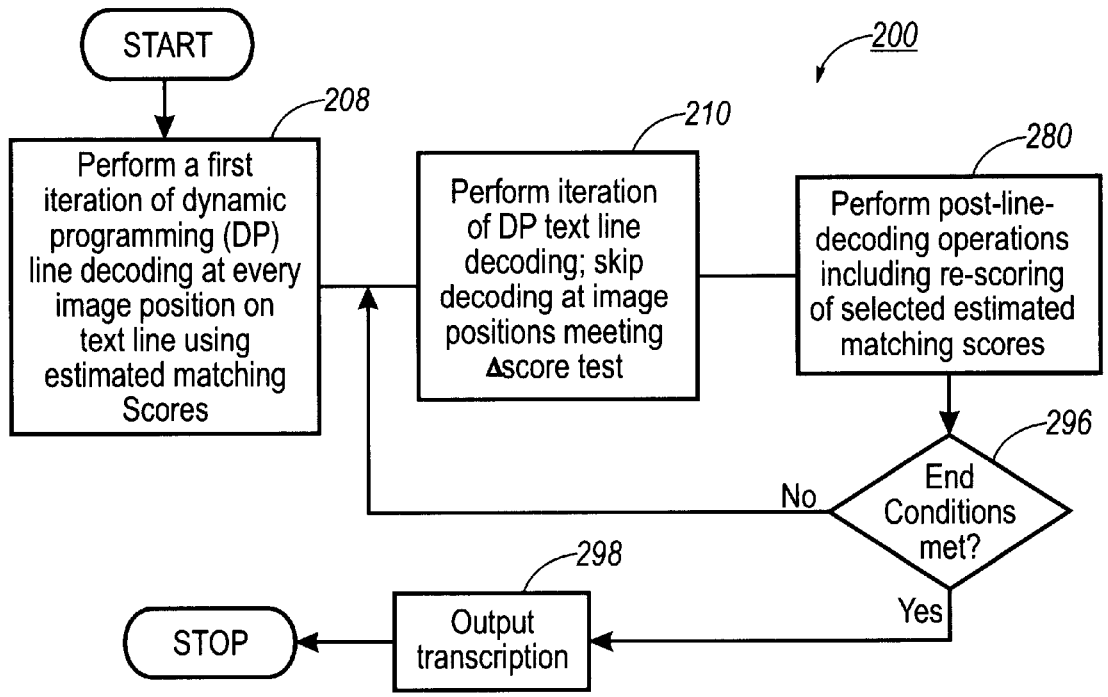
FIG. 3 is a flowchart illustrating the general functions of the dynamic programming operation for decoding an image text line according to an embodiment of the present invention.

FIG. 3 is a general flowchart of the major processes of the illustrated embodiment of the improved dynamic programming technique of the present invention showing operations 208, 210 and 280. At least one iteration of full dynamic programming decoding is first performed, in box 208, using the decoding trellis with branches labeled with heuristic scores. In an actual implementation of the present invention, two initial iterations of decoding are performed. An initial iteration is followed by post-line-decoding processing 280, which is described in detail in the discussion accompanying FIG. 4. Operation 210 provides one iteration of line decoding including skip mode processing. Procedure 280 handles processing after each iteration of decoding has finished. The text line decoding is complete when conditions in box 296 are met. Decoding terminates when the estimated best path just computed in the last iteration, referred to as the current path, is identical to the immediately prior path, or when all of the incoming branches to nodes in the decoding trellis that are identified as being in the current best path have been re-scored with actual template-image matching, scores. Once decoding has terminated, the output transcription is available, in box 298.

a. Post-line-decoding Processing

Figure 4:
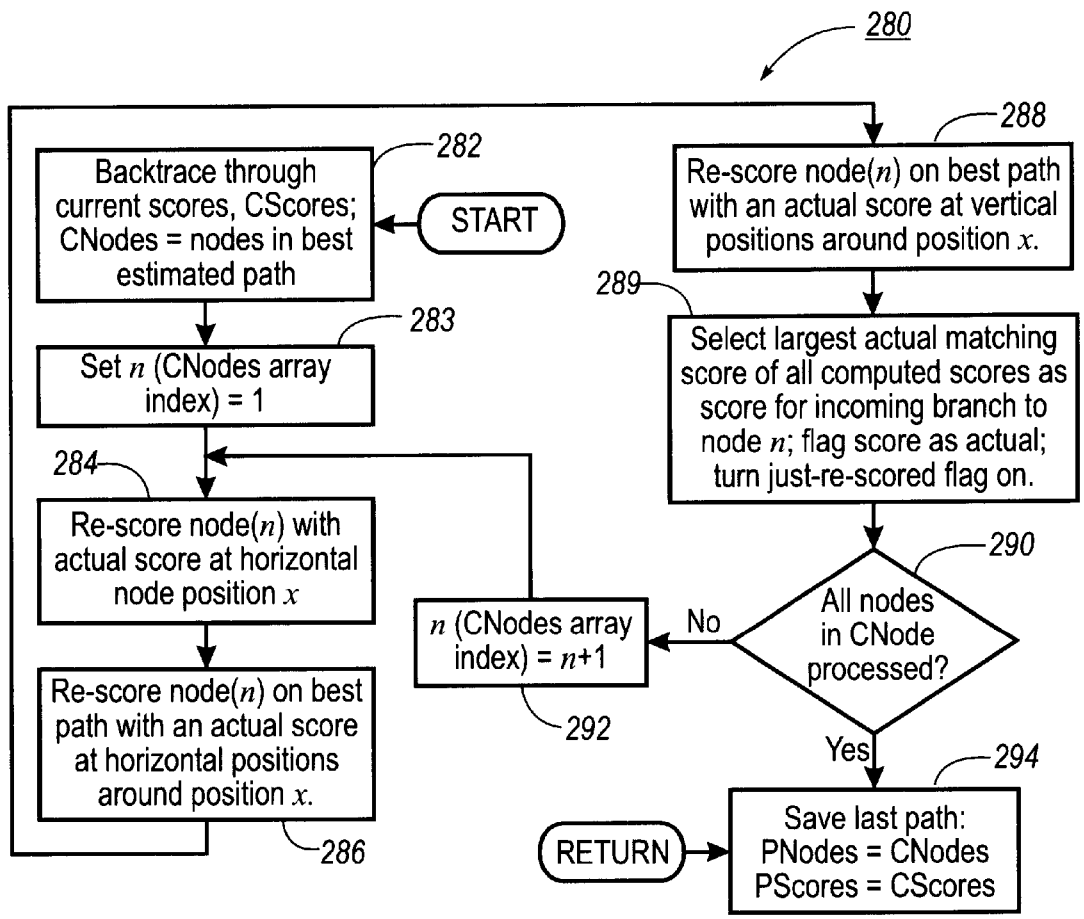
FIG. 4 is a flowchart illustrating the details of the post-decoding function of the dynamic programming operation, as shown in FIG. 3, according to an embodiment of the present invention.

It is useful in understanding the details of operation 210 to first describe post-line-decoding operation 280, the details of which are illustrated in the flowchart of FIG. 4. Operation 210 (FIG. 6) produces an array of node scores, including one cumulative path score for each x position in the text line image, and a backpointer array. At the end of an iteration of decoding, backtrace processor 282 (FIG. 4) uses the backpointer array to determine the nodes that comprise a current estimated best path through image network 80. A message string, or transcription, is formed from this path. The transcription is composed of an ordered sequence of concatenated character labels associated with the templates that are on the branches into the nodes of the estimated best path. The image positions of the nodes in the estimated path are stored in a data structure. In the illustrated embodiment shown in FIG. 4, the x positions of the nodes in the estimated best path are stored in an array called CNodes.

Then, in the processing loop represented by boxes 283 through 292 of FIG. 4, post-line-decoding operation 280 performs several operations that compute actual template-image matching scores for each node in the estimated best path. These operations are collectively referred to as re-scoring the nodes of the best path. This is abbreviated terminology for producing the actual template-image matching scores for only the branches of the decoding trellis associated with the templates identified by the best path nodes, and only at the horizontal image position of these nodes and their immediately adjacent horizontal and vertical image positions. The largest of the computed actual template-image matching scores in the neighborhood of the node position is placed on the branch in the decoding trellis for that node, replacing the heuristic score on that branch. Producing actual template-image matching scores only during post-line-decoding is typically an inexpensive computation. Re-scoring is done only for text line positions of the identified nodes, not for all W text line positions, and only for the character template identified by the label of the transition into a node, not for all templates at all node positions. So for example, a text line roughly the size of a text line in this disclosure would yield a total number of between 70 to 90 nodes, approximately. If actual scores are computed for each image position in a six by five neighborhood of image positions around each node, only 2100 to 2700 actual template-image matching scores would need to be computed per decoding iteration, and this number generally decreases in each iteration as more nodes are included in the estimated best path that were in a previous estimated best path. As each decoding iteration produces an estimated best path with more and more nodes having actual scores on their incoming branches, fewer new actual scores will need to be computed.

The CNode array index, n, is set to 1 in box 283, and the loop processing begins. First, in box 284, for each character template identified by a character label in the transcription derived from the estimated best path, the actual template-image matching score for that template is computed at the image location of its node. Specifically, with reference to FIG. 2, in order to compute the actual score, character template 21 is placed with respect to image 10 such that origin 22 is positioned at the x location of the best path node minus set width 28 of template 21. The actual score is computed by performing an AND operation between the 2D portion of the image and the two-dimensional (2D) character template image placed at the node location as just described and then summing the resulting ON pixels.

Figure 5:
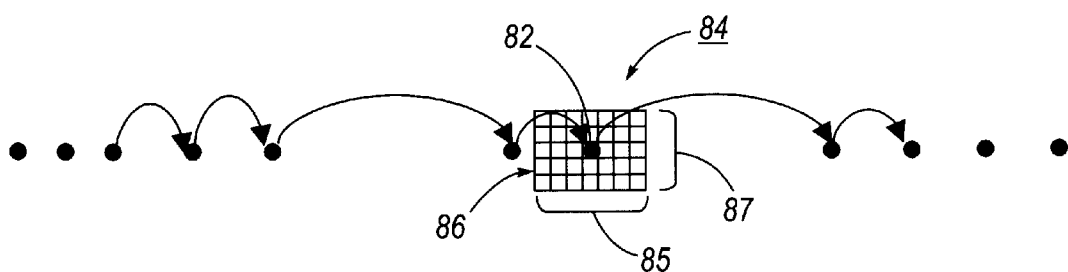
FIG. 5 schematically illustrates a series of nodes in a text line image that form a partial path, and an image region where a re-scoring function is performed, according to the flowchart of FIG. 4.

The additional re-scoring tasks in boxes 286 and 288 are based on the premise that the template that has been estimated to match at that node may actually produce a higher actual matching score with the image at a location one or two pixels removed vertically or horizontally. This area around the node might be viewed as forming a square or rectangular, horizontal and vertical "jitter" search region of image positions around the image position representing the node. Thus, these tasks focus on computing actual template-image matching scores in the neighborhood of each node. FIG. 5 shows a series of nodes in a text line image that form a partial path 84 through the image. Node 82 is included in path 84. The rectangular image area 86 surrounding node 82 is the jitter search region just referred to. Note that in an alternative implementation, the horizontal and vertical "jitter" search region may be eliminated, and re-scoring may be confined to just the original node.

The first additional re-scoring task, in box 286 of FIG. 4, is motivated by re-scoring results from experimental observation of operation 210. It was observed that some of the dynamic programming decoding iterations resulted from an anomaly in the upper bound scores for a template that was determined to be in the estimated best path in a prior iteration. Such a template would have its heuristic score replaced by its actual score for just that node position as part of the re-scoring task after a prior iteration. It was found that the heuristic scores for the same template at x positions that were near (e.g., within one to two pixel positions on either side of) the current node's x position of the re-scored template exceeded the template's actual score. This results because the upper bound scores for the matching template at x locations adjacent to the node location on the text line could be as high as or greater than the actual score for the matching template at the best template position. When the upper bound scores at adjacent positions exceed the template's actual score, the decoder performs extra iterations through these adjacent line positions, identifies them as being nodes on the best path, and re-scores these upper bound scores to actual scores that are lower than the template's actual score at its best node position in a prior iteration.

In order to avoid these extra Viterbi iterations, re-scoring task 286 is added. For the node being processed, an actual template-image score is also computed for each of a span of x pixel positions on the text line around the x position identified as the estimated path node position. For example, re-scoring a total of five x positions may be sufficient to eliminate the problem of the extra Viterbi iterations. FIG. 5 illustrates this concept by showing horizontal span of pixels 85 around node 82.

The second of the re-scoring operations, in box 288, assists in locating the best vertical baseline position at which to match each character template. The baseline of the text line image at which decoding takes place is not necessarily the true baseline, and noise in the image produced by either the printing or scanning of the image may cause a baseline to vary from being an exact straight line at some constant angle 0. Indeed, the baseline may be defined by a function, such as a function identifying its slope, for example. And applying standard image processing techniques such as deskewing does not always result in a straight image text line. In the re-scoring task of box 288, testing for the best baseline position is also done sparsely, only for the character templates identified as being in the estimated best path. At every node identified as part of the estimated best path, the template at that node's x position is matched with the text line image at several different vertical (y) positions, and an actual template-image score is computed. Actual template-image scores are also computed for each of a span of y pixel positions for each of the x positions in the span of adjacent x pixel positions identified in task 286. FIG. 5 illustrates this by showing vertical span 87 of pixel positions around node 82 in path 84. Thus, in re-scoring tasks 286 and 288 of FIG. 4, actual template-image scores are computed for each pixel position of a small rectangle 86 (FIG. 5) of image positions surrounding the x position 82 identified as the estimated path node position.

Then, in box 289 of FIG. 4, the largest of all of these actual template-image matching scores computed for the template for all positions in the neighboring rectangle of image positions is selected. This largest score indicates the actual template image matching score that is to be used on the incoming branch to this node. Post-line-decoding operation 280 also turns on, in box 289, an actual-score flag associated with the score for that template-image position pair, indicating that there is an actual score in the trellis for that branch. Post-line-decoding operation 280 also uses a just-re-scored flag to keep track of which actual scores have just been computed as a result of this current decoding iteration. Thus, at the start of operation 280 all just-re-scored flags are turned off, and as the largest actual template-image matching score is selected, its associated just-re-scored flag is turned on, in box 289.

With continued reference to FIG. 4, after completion of the re-scoring process, a query is made in box 290 to see if all nodes in CNode array have been processed. If not, control passes to box 292 where the node array index is incremented and processing control passes to box 284 to perform re-scoring for the next node. When all nodes have been processed, control passes to box 294. The current estimated best path and the current node scores for every image position on the text line are stored in memory as the prior path of node locations, PNodes, and the prior set of node scores, PScores, both of which are accessible to operation 210 (FIG. 6) for the next iteration of decoding.

Processing control then passes to the test in box 296 (FIG. 3) to determine whether decoding should be terminated or continued. Upon completion of decoding, the transcription output is available for printing or further processing by another operation.

b. Implementation of Skip Mode in the Dynamic Programming Operation

Figure 6:
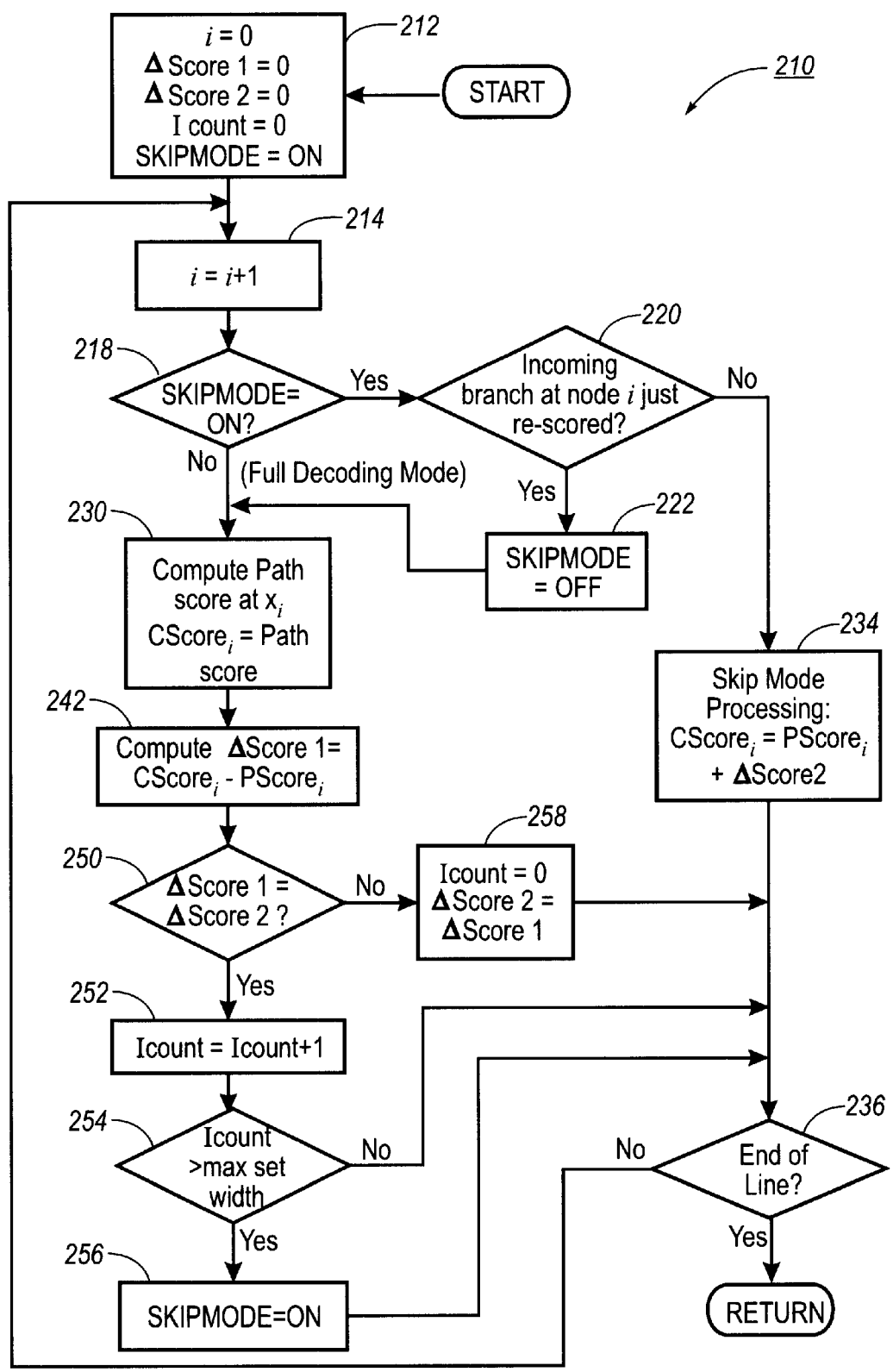
FIG. 6 is a flowchart illustrating the details of the process flow during one iteration of decoding the image text line, showing both the added skip mode of processing during a decoding iteration and the functionality for testing for skip mode, according to an embodiment of the present invention.

The details of operation 210 including skip mode processing and testing for skip mode processing are shown in the flowchart of FIG. 6. The outputs of operation 210 include the node score and backpointer arrays. For every position x on the text line image, there must be a cumulative path score indicating the maximum path score from among all paths leading to that image position. The present invention modifies the conventional text line decoding operation to have two processing modes available to process a position x on the text line image. The first processing mode is execution of the full dynamic programming operation to compute the maximum cumulative path score at position x. The second processing mode is execution of skip mode where the cumulative path score at position x is the prior path score at position x plus a path score change value.

Skip mode processing is premised on the observation that, during a subsequent decoding iteration, the cumulative path score for a given image position will change from the prior iteration's cumulative path score for that position only if it is the location of a node, or it follows a node, that has an incoming branch that was just re-scored in the previous iteration. In addition, even if an incoming branch of a node on the prior estimated path was previously just re-scored, it may be the case that the path in this area of the text line will continue along the same nodes in this iteration as it did in the prior iteration. That is, the change in the cumulative path score produced by re-scoring the node will simply be propagated to the cumulative path scores for some subsequent portion of image positions on the text line. The ability to detect this condition during a decoding iteration for some portion of the text line means that it would not be necessary to perform the full, recursive dynamic programming decoding at each image position. Rather, when conditions for skip mode have been met, computing current cumulative path scores can be accomplished by propagating the score change to prior scores for those subsequent image positions after the re-scored branch where there are no other just re-scored branches.

Operation 210 begins with initialization tasks in box 212. In particular, data variables $\Delta$Score1 and $\Delta$Score2 are set to zero. $\Delta$Score2 contains the change value for the cumulative path score that operation 210 tracks during decoding of the text line. $\Delta$Score1 contains the change value for the cumulative path score at the current image position being processed. In addition, a processing switch called SKIPMODE is set to ON, indicating that the decoder should start in skip mode processing. This is to allow for full decoding of the beginning portion of a text line to be skipped as long as there are no re-scored branches in the decoding trellis. Boxes 214 and 236 control the loop for processing every image position x on the text line. Control passes to post-line-decoding operation 280 at the end of the text line.

First, the SKIPMODE flag is tested to see if it is ON. If so, control passes to the test in box 220. If not, the processing mode is full decoding mode, and control passes to box 230. Test 220, at each image position x on the line, checks to see if there is a node at this position that has an associated just-re-scored flag turned on, indicating that the incoming branch in the trellis at position $x_i$ has just been re-scored. If not, then there is no incoming just re-scored branch at position $x_i$ and skip mode processing is in effect for this image position, since SKIPMODE was previously determined to be ON. Control passes to box 234 where the decoder computes the current score, CScore$_i$ for position $x_i$ to be the prior score, PScore$_i$ plus the change value stored in $\Delta$Score2. Performing the full computation, in box 230, of the cumulative path score is avoided for this image position. At the beginning of the line, SKIPMODE is ON and as long as no just re-scored branches are found, the decoder computes the current score, CScore$_i$ for position $x_i$ to be the prior score, PScore$_i$ plus the zero change value stored in $\Delta$Score2. Processing control then passes to end of line testing, in box 236, and back to the beginning of the loop, to the next image position.

When test 220 detects that position $x_i$ has an incoming just re-scored branch associated with it in the decoding trellis, control passes to box 222 where SKIPMODE is turned OFF. Control then passes to box 230 where the decoder now goes into full decoding mode. In box 230, the recursive dynamic programming operation computes a cumulative path score for the current image position. A description of the actual computation of the cumulative path score may be found in the '444 ICP patent at cols. 7–9 and the description accompanying FIGS. 20–21 therein.

Control then passes to a series of functions in boxes 242, 250, 252, 254, 256 and 258 for testing whether the criteria for skip mode processing are met as a result of processing position $x_i$ such that the SKIPMODE flag should be turned ON. Full dynamic programming decoding continues as long as SKIPMODE is OFF.

Recall that when the decoding operation is in skip mode, the current cumulative path score at $x_i$ is computed to be the prior cumulative path score at $x_i$ plus the change value in $\Delta Score2$. Propagation of a cumulative path score change may only occur, however, if the change amount is substantially constant for a series of image positions greater than the largest set width of a character template in the template library. This rule ensures that the cumulative path scores for all predecessors of a subsequent node have changed by the same amount, so that the cumulative path score for the subsequent node must also change by that amount, no matter what incoming branch is chosen. The process for testing for skip mode operation computes the change score value, tracks for how many image positions the change score value is the same, and turns the SKIPMODE switch ON if the required conditions are met. The change score value and Icount, the counter that tracks the number of image positions, are reset if a change score value is found to be different from a previous change score value.

With continued reference to FIG. 6, operation 210 computes, in box 242, the current change value, $\Delta Score1$, in the cumulative path score between the current ($Cscore_i$) and prior cumulative path scores ($Pscore_i$) at position $x_i$. A test is then made in box 250 to see if the score change value for the current image position, $\Delta Score1$, is equal to the score change value being tracked, which is stored in $\Delta Score2$. If the score change values are equal, a counter is incremented in box 252, and test 254 checks to see if the counter exceeds the number of image positions of the maximum character template set width. If test 254 is negative, processing control passes to end-of-line testing without changing the SKIPMODE switch. If test 254 is positive, the requisite number of image positions having the same constant change value have been counted and SKIPMODE is turned ON. Processing control then passes to end of line testing.

When test 250 fails, the score change value computed for the current cumulative path score is different from the score change value being tracked. This indicates that the score change value between current and prior decoding iterations is not remaining constant, signaling that this image position is not appropriate for counting toward a skip mode test. The counter is then reset to zero in box 258, and the new change value in $\Delta Score1$ is now the change value to be tracked in future processing and so is stored in $\Delta Score2$. Processing control then passes to the end-of-line test in box 236.

As mentioned earlier in the Summary, there may be some operating environments where it is not strictly necessary to require that the change in cumulative path score be a fixed constant amount for a certain number of image positions in order to turn skip mode processing on. The change in cumulative path score could be substantially constant; that is, the change could be within a small range, say a very small percentage of the total cumulative path score. Thus, the test in box 250 would be stated differently. This alternative implementation should be used with care and experimental testing should confirm that the accuracy of the ultimate decoding output is not compromised.

Operation 210 shows that, once SKIPMODE is turned ON, the score change value can be propagated to current cumulative path scores as long as no incoming just-re-scored branch is encountered in the decoding trellis. As soon as the score change value, $\Delta Score1$, is not the same as the value being tracked, $\Delta Score2$, the counter is reset to zero and tracking for skip mode processing begins again with the next image position. Note that in box 222, where the SKIPMODE switch is turned OFF because this image position is a node having a just-re-scored incoming branch, resetting the counter Icount to zero is also possible but not required here. The key test for controlling the counter is whether the current score change value just computed for the current image position is the same as the score change value being tracked. When a just-re-scored branch occurs, the new score change value will most likely differ from the previous one but may not. When the new score change value is the same as the previous one despite a just re-scored branch, this indicates that the effect on cumulative path scores of a previously just-re-scored branch in the decoding trellis is continuing through the most recent just-re-scored branch in the trellis, and so counting toward skip mode processing status may continue. Resetting the counter only in box 258 should be sufficient.

3. Overview of a Stochastic Finite State Network Text Line Decoder

The dynamic programming techniques of the present invention are directed to improving the computational efficiency of an image recognition process that decodes one or more lines of text, where a line of text is modeled as a stochastic finite-state network, and where the dynamic programming operation is used to perform recognition of the text line characters. Thus, the inventive technique herein may be used in implementations of DID that use stochastic finite-state networks that model a full page of text. In those implementations, the technique may be incorporated as part of the decoding of individual text lines during the decoding of the full document page. The reader is directed to the '773 DID patent and to the '444 ICP patent at cols. 5–7 and the description accompanying FIGS. 15–18 therein for the description and operation of a Markov source model for a class of 2D document images. Additional description may also be found in U.S. Pat. No. 5,689,620, at col. 36–40 and the description accompanying FIG. 14 at col. 39–40 therein.

The inventive technique may also be used in image recognition systems in which the stochastic finite-state network models only a single line of text. Such a model is illustrated by way of example as image source model 800 in FIG. 9. A brief review of the characteristics, attributes and operation of image source model 800 is provided here for convenience.

Image source model 800 is a simple source model for the class of document images that show a single line of English text in 12 pt. Adobe Times Roman font. A single text line model in this context is referred to as a one-dimensional model, in contrast to a document model that describes a full page of text, which is referred to in this context as a two-dimensional model. In model 800, documents consist of a single horizontal text line composed of a sequence of typeset upper- and lower-case symbols (i.e., letter characters, numbers and special characters in 12 pt. Adobe Times Roman font) that are included in the alphabet used by the English language. The image coordinate system used with the class of images defined by model 800 is one where horizontal movement, represented by x, increases to the right, and there is no vertical movement in the model. The left edge of the image is at x=0, and the right edge of the image is at x=W, where W indicates the width of the image in pixels. Text line image portion 10 of FIG. 2 is assumed to be an image in the class of documents described by Markov source 800, having dimensions W×H with an origin at the upper left corner where y=x=0 in an x, y coordinate system.

Markov source model 800 has initial state node $n_I$, "printing" state node $n_1$, and final state $n_F$. At node $n_1$ there are three different types of transitions indicated by loops 802, 804 and 806, with each transition shown labeled with its attributes. The attributes of transition 802 include a probability (0.4) and a horizontal displacement of 1 pixel. This transition allows for the addition of a small amount of spacing (i.e., one pixel at a time) between character templates along the horizontal text line. Transition 804 allows for the placement of a full space along the horizontal text line. The attributes of transition 804 include a probability of 0.4, the label 805 for the space character, and a horizontal displacement along the horizontal text line of set width $W_s$. Finally, the group of self-transitions 806 accommodates all of the character templates included in model 800. The attributes of each transition $t_m$ of transition group 806 include a probability based on the total number, m, of character templates Q, the character label 808 associated with an individual template 809, and a horizontal displacement $W_m$ along the horizontal text line indicating the set width 807 of the character template.

Figure 9:
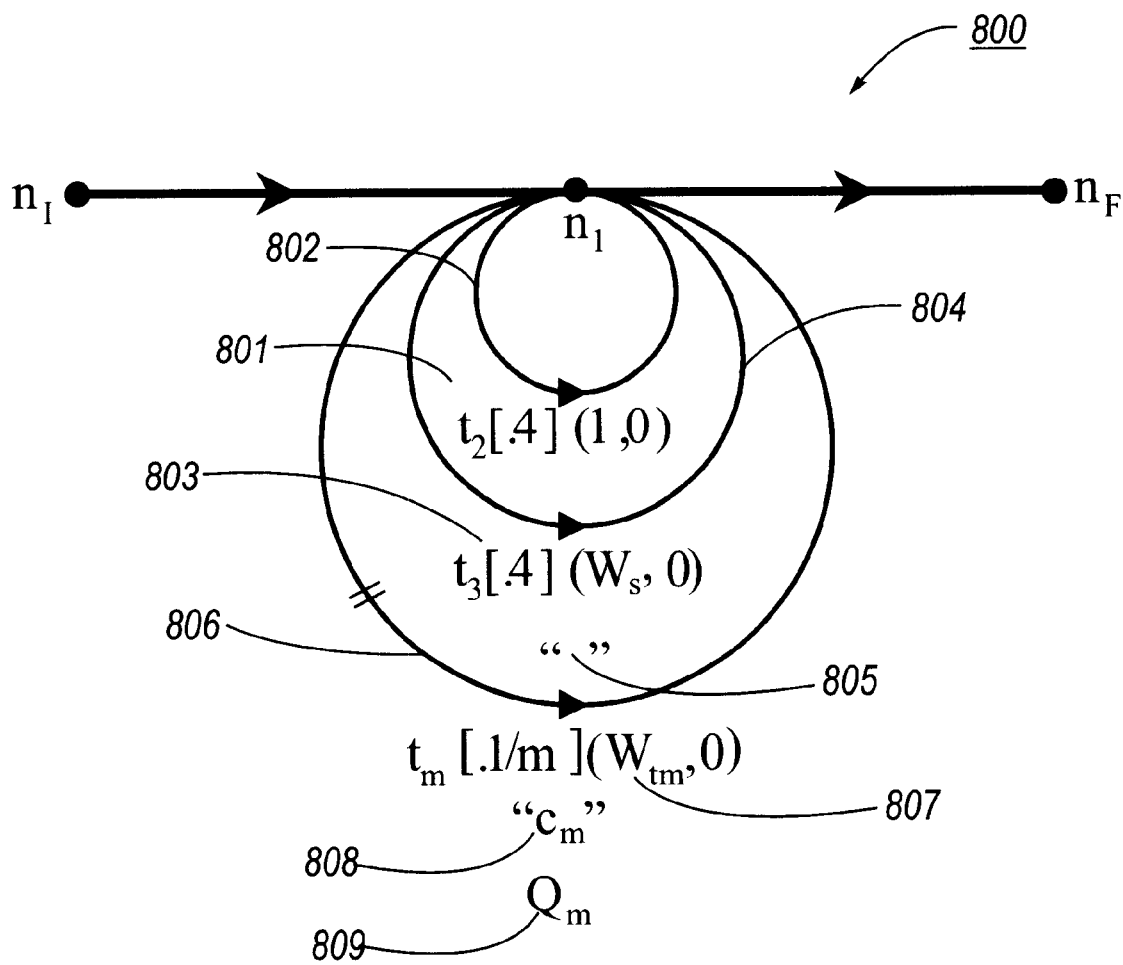
FIG. 9 is a schematic illustration of a simplified Markov source modeling a class of one-dimensional document images that each contains a single line of English text.

Markov source model 800 of FIG. 9 serves as an input to an image synthesizer in the DID framework. For an ordered sequence of characters in an input message string in the English language, the image synthesizer generates a single line of text by placing templates in positions in the text line image that are specified by model 800. The operation of text column source model 800 as an image synthesizer may be explained in terms of an imager automaton that moves over the image plane under control of the source model. The movement of the automaton constitutes its path, and, in the case of model 800, follows the assumptions indicated above for the conventional reading order for a single line of text in the English language.

From the initial state at node $n_I$ at the left edge of the image, the imager automaton transitions to node $n_1$ in preparation for placing character templates at the beginning of a horizontal text line. The imager proceeds through iterations of the self-transitions at node $n_1$ horizontally from left to right, through transitions 802, 804 and 806. The imager moves to the right by a displacement of 1 pixel at a time through transition 802 to introduce fine spacing on the text line. The imager moves to the right by the displacement $W_s$ through transition 804 to introduce a space on the text line. The imager places a character template 809 on the text line and then moves through transition 806 by the set width 807 of the template to the next position on the line. The imager moves along the text line until there are no more characters to be printed on the line or until the imager has reached the right end of the line, when the imager transitions to the final node $n_F$. Decoding a text line image produced by the imager of model 800 involves finding the most likely path through model 800 that produced the text line.

Note that text line document image decoding using a Markov source of the type just described may be implemented using conventional image processing methods to locate the baselines of the text lines. After an input image has been de-skewed and text blocks and text lines have been identified, text line baselines can be identified using horizontal pixel projections of the text line. One such method includes the following steps: compute the horizontal pixel projection array for the image region containing the text line, and derive from this array an array including entries for the differential of the scan line sums, where the i-th entry in this array is the difference between the number of pixels in the i-th row and i+1-th row. Assuming the convention that the pixel rows are numbered from top to bottom, the baselines are easily observed as a negative spike in the differential scan line sums. The row identified as the baseline can then be used as the row at which the dynamic programming operation takes place. More information on this method of locating baselines may be found in reference [7].

4. The Machine and Software Product of the Invention

Figure 10:
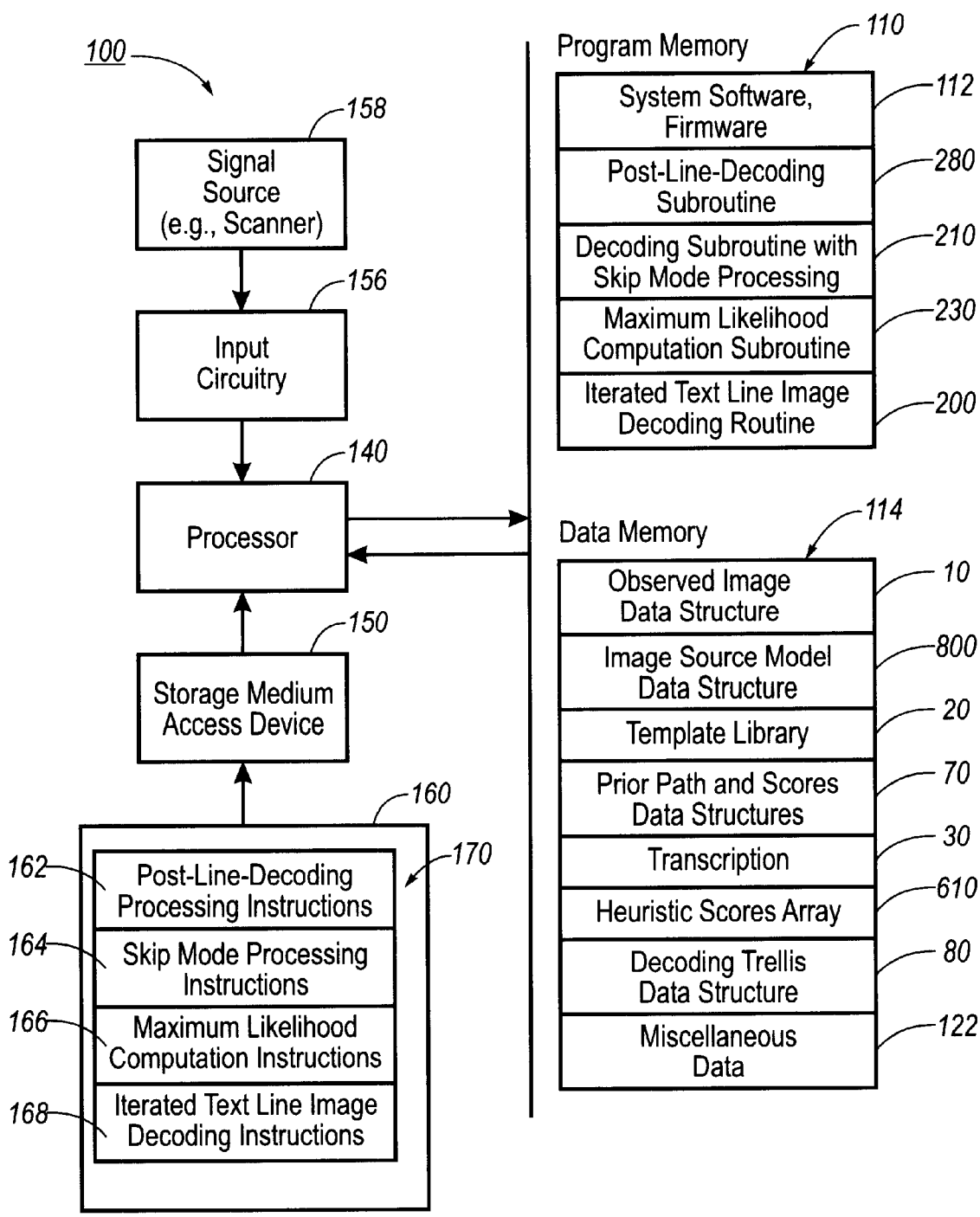
FIG. 10 is a simplified block diagram illustrating a suitably configured machine in which the present invention

FIG. 10 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized, for the purpose of carrying out the invention. Alternatively, machine 100 may comprise a general-purpose computer selectively activated or reconfigured by a computer program stored in the computer. In still another alternative machine 100 may be a combination of a general-purpose computer and auxiliary special purpose hardware. When a machine such as machine 100 is suitably programmed to embody the present invention, the machine is not a standard or known configuration.

Machine 100 may be configured to perform text line image decoding operation 200 of FIG. 3 to perform iterated text line image decoding using estimated scores on the branches in the decoding trellis. An input observed image, such as image 10 of FIG. 2, is provided from signal source 158. Signal source 158 may be an image scanner, a memory device, a communications channel, a data bus, another processor performing an operation, or any other suitable source of bitmapped image signals. For example, signal source 158 may be an image capture device, such as a scanning device, a digital camera, or an interface device that produces a digital image definition data structure from another type of image signal. An input image provided by signal source 158 is forwarded via input circuitry 156 to processor 140 and may be stored in data memory 114. Machine 100 may, but need not, include a conventional display device (not shown) capable of presenting images, such as a cathode ray tube, a liquid crystal display (LCD) device, a printing device, or any other device suitable for presenting images.

Processor 140 operates by accessing program memory 110 to retrieve instructions, which it then executes. When machine 100 is configured to perform iterated text line decoding operation 200 of FIG. 3 to produce a transcription from an input text line image, program memory 110 includes decoding instructions that implement operations 208, 210 and 280 of FIG. 3. For example, program memory 110 includes subroutine 230 for computing the maximum likelihood score at an image position, and subroutine 210 for performing skip mode processing.

During execution of the instructions, processor 140 may access data memory 114 to obtain or store data necessary for performing its operations. For example, when machine 100 is configured to perform operation 200 of FIG. 3, processor 140 accesses template library 20, observed input image 10 and decoding trellis data structure 80, or another type of data structure suitable for performing a dynamic programming operation, in data memory 114 in order to perform operation 200. Processor 140 stores prior decoding path and scores arrays 70 in data memory 114 during the iterated text line decoding operation. Processor 140 may also store the output transcription 30 of a decoded text line. Data memory 114 also stores a stochastic finite state network that represents an image source model, such as the line image source 800 of FIG. 9. Data memory 114 also stores various other miscellaneous data 122 such as data needed by skip mode processing subroutine 210.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.) Machine 100 may also include a user-controlled input signal device (not shown) for sending signals to processor 140 to initiate the operations of FIG. 3 for an input image 10. Such an input device may be connect to processor 140 by way of a wire, wireless or network connection.

FIG. 10 also shows software product 160, an article of manufacture that can be used in a machine that includes components like those shown in machine 100. Software product 160 includes data storage medium 170 that can be accessed by storage medium access circuitry 150. Data storage medium 170 stores instructions for executing operation 200 of FIG. 3. Software product 160 may be commercially available to a consumer in the form of a shrink-wrap package that includes data storage medium 170 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 170 is inserted in order for the storage medium access circuitry to access the data stored thereon. Examples of storage medium access devices include disk drives, CD-ROM readers, and DVD devices. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 170 when data storage medium 170 is stored as part of a remotely-located storage device, such as a server. Software product 160 may be commercially or otherwise available to a user in the form of a data stream indicating instruction data for performing the method of the present invention that is transmitted to the user over a communications facility from the remotely-located storage device. In the latter case, article 160 is embodied in physical form as signals stored on the remotely-located storage device; the user purchases or accesses a copy of the contents of data storage medium 170 containing instructions for performing the present invention, but typically does not purchase or acquire any rights in the actual remotely-located storage device. When software product 160 is provided in the form of a data stream transmitted to the user over a communications facility from the remotely-located storage device, instruction data stored on data storage medium 170 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

FIG. 10 shows data storage medium 170 configured for storing instruction data for performing operation 200 (FIG. 3). This instruction data is provided to processor 140 for execution when iterated text line decoding is to be performed. The stored data includes maximum likelihood computation instructions 166, skip mode processing instructions 164 and post-line-decoding instructions 162. When these instructions are provided to processor 140, and processor 140 executes them, the machine is operated to perform the operations for iteratively decoding a text line image according to the operations of FIG. 3, FIG. 4 and FIG. 6. For example, when maximum likelihood computation instructions 166 are provided to processor 140, processor 140 executes them, causing the machine to perform the operations computing a maximum likelihood score at an image position using the scores in the decoding trellis data structure, as shown in box 230 of FIG. 6. When skip mode processing instructions 164 are provided to processor 140, and processor 146 executes them, the machine is operated to perform the operations for determining whether skip mode should be turned on, as represented in the flowchart of FIG. 6. When post-line-decoding processing instructions 162 are provided to processor 140, and processor 140 executes them, the machine is operated to perform operations for identifying and re scoring the nodes of the current estimated best path, and for updating prior path and score data structures for the next iteration, as represented in the flowchart of FIG. 4.

An embodiment of the present invention has been implemented as a software program on a Sun UltraSparc machine running the Sun Solaris operating system, available from Sun Microsystems, Inc. of Mountain View Calif. The system was configured with 256 MB RAM memory and a disk swap space of 1 GB. The software program is written in the ANSII C programming language, using a compiler obtained from Sun Microsystems. A version has also been implemented on a PC configured with the Linux operating system and using the GCC compiler.

Implementation of the skip mode processing technique of the present invention as part of the Document Image Decoding text recognition system requires familiarity with the details of DID as disclosed in U.S. Pat. Nos. 5,321,773 and 5,526,444, and in references [3], [4] and [5] noted in the Appendix of Referenced Documents that follows below. Those references, in turn, presume an understanding of probability and decision theory as they relate to pattern-matching problems, and presume further a working knowledge and familiarity with the implementation of hidden Markov models for modeling the occurrence of a sequence of observable symbols. This knowledge is available from a number of texts and articles on the subjects, including the texts and articles by Huang et al. and Rabiner et al. listed as Other Publications in U.S. Pat. No. 5,689,620 and referenced therein at col. 35. The reader is directed to these references if further information is needed in order to implement the present invention in conjunction with the DID text recognition system.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

APPENDIX OF REFERENCED DOCUMENTS

[1] C. B. Bose and S. Kuo, "Connected and Degraded Text Recognition Using A Hidden Markov Model," 11<sup>th</sup> *International Conference on Pattern Recognition*, The Hague Netherlands, September 1992.

[2] F. Chen and L. Wilcox, "Wordspotting In Scanned Images Using Hidden Markov Models", 1993 *IEEE International Conference on Acoustics, Speech and Signal Processing*, Minneapolis, Minn., Apr. 27–30, 1993.

[3] P. Chou and G. Kopec, "A Stochastic Attribute Grammar Model Of Document Production And Its Use In Document Recognition," *First International Workshop on Principles of Document Processing*, Washington, D.C., Oct. 21–23, 1992.

[4] G. Kopec and P. Chou, "Document Image Decoding Using Markov Source Models", *IEEE Transactions on Pattern Analysis and Machine Intelligence*, Vol. 16, No. 6, June 1994, pp. 602–617.

[5] G. Kopec, "Row-Major Scheduling Of Image Decoders," *Technical Report P92-0006 (EDL-92-5)*, Xerox Palo Alto Research Center, Palo Alto, Calif., June 1992.

[6] A. Kam and G. Kopec, "Document image decoding by heuristic search," *IEEE Transactions on Pattern Analysis and Machine Intelligence*, Vol. 18, No. 9, September 1996, pp. 945–950.

[7] F. R. Chen, D. S. Bloomberg, and L. D. Wilcox, "Spotting phrases in lines of imaged text", *Proceedings of SPIE, Document Recognition II*, Vol. 2422, February 1995, pp. 256–269.

What is claimed is:

1. A method for operating a processor-controlled machine to decode a text line image; the method comprising:

while a skip mode switch is off, for each image position in the text line image, a first computing step of computing a maximum cumulative score indicating a measurement of a match between a sequence of character templates and an image region in the text line image from a starting location of the text line image to the image position;

a second computing step of computing a score change value between the maximum cumulative score and a prior maximum cumulative score computed at the image position; and comparing the score change value to a prior score change value and turning the skip mode switch on when the score change value is substantially constant for at least a predetermined number of consecutive image positions in the text line image;

while the skip mode switch is on, for each image position in the text line image, a third computing step of computing the maximum cumulative score by adding the score change value to a prior maximum cumulative score computed at the image position; and producing a transcription of the text line image using the maximum cumulative scores.

2. The method of claim 1 for operating a processor-controlled machine to decode a text line image wherein the first computing step of computing a maximum cumulative score includes using estimated matching scores to compute the maximum cumulative score; each estimated matching score indicating an estimated measurement of a match between a character template and an image region in the text line image;

wherein the first and second computing steps, the comparing step and the third computing step are repeated in a plurality of iterations until a stopping condition is met; each iteration producing an estimated best transcription; and wherein the method further includes performing a re-scoring operation after each iteration; the re-scoring operation computing an actual matching score for each image position indicating a character template included in the estimated best transcription; the actual matching scores being available for computing maximum cumulative scores in subsequent iterations.

3. The method of claim 2 wherein the method for operating a processor-controlled machine to decode a text line image further includes the step of turning the switch mode off when the image position represents a location of a character template in an estimated best path output from a prior iteration for which an actual matching score was computed.

4. The method of claim 1 for operating a processor-controlled machine to decode a text line image wherein the at least predetermined number of consecutive image positions in the text line image is greater than a maximum set width of a character template.

5. The method of claim 1 for operating a processor-controlled machine to decode a text line image wherein the text line image is represented as a stochastic finite state image network including a plurality of nodes and directed branches between nodes; the stochastic finite state image network including a plurality of possible paths each indicating an ordered sequence of nodes and directed branches between nodes indicating a possible spatial arrangement of character templates in the text line image; and producing the transcription of the text line image using the maximum cumulative scores includes producing a path of nodes and directed branches between nodes through the stochastic finite state image network using the maximum cumulative scores.

6. The method of claim 1 for operating a processor-controlled machine to decode a text line image wherein the first computing step of computing a maximum cumulative score uses a dynamic programming operation to compute the maximum cumulative score; and wherein the third computing step of computing the maximum cumulative score by adding the score change value computes the maximum cumulative score without using the dynamic programming operation.

7. The method of claim 1 for operating a processor-controlled machine to decode a text line image wherein the text line image is represented as a graph data structure; and wherein a total number of consecutive image positions in the text line image for which the skip mode switch is on forms a cut set in the graph data structure.

8. A method for operating a processor-controlled machine to decode a text line image; the method comprising:

representing the text line image as a stochastic finite state image network including a plurality of nodes and directed branches between nodes; each directed branch having associated therewith a plurality of attributes including a character template and a character label identifying a character symbol represented by the character template; the stochastic finite state image network including a plurality of possible paths each indicating an ordered sequence of nodes and directed branches between nodes indicating a possible spatial arrangement of character templates in the text line image; each character template indicating a character label; a plurality of ordered character labels formed by a path indicating a transcription of the text line image;

assigning one of a plurality of estimated template-image matching scores to each directed branch in the stochastic finite state image network; each estimated template-image matching score indicating an estimated measurement of a match between an image region of the input text line image and the character template associated with the directed branch;

performing a repeated sequence of a decoding operation followed by a re-scoring operation until a stopping condition is met; the decoding operation computing maximum cumulative path scores at image positions in the text line image using the plurality of estimated matching scores; the decoding operation producing a best path of directed branches and nodes through the stochastic finite state image network using the maximum cumulative path scores; and producing the transcription of the input text line image using the character labels associated with the directed branches of the best path;

the re-scoring operation computing, after every repetition of the decoding operation, actual template-image matching scores between character templates and image regions identified by nodes included in the best path and re-labeling directed branches of the stochastic finite state image network incoming to nodes included in the best path with the actual matching scores;

the decoding operation computing the maximum cumulative path scores at selected image positions in the text line image by adding a score change value to a prior maximum cumulative path score when the score change value between maximum cumulative path scores computed during production of a prior best path and maximum cumulative path scores computed during production of a current best path using the actual matching scores produced by the re-scoring operation is substantially constant for at least a predetermined number of consecutive image positions in the text line image.

9. The method of claim 8 for operating a processor-controlled machine to decode a text line image wherein the re-scoring operation further includes, for each node included in the best path, computing a plurality of actual template-image matching scores between character templates and image regions for a plurality of image positions surrounding the node; and wherein re-labeling the directed branch incoming to the node with the actual matching score includes re-labeling the directed branch incoming to the node with a largest actual matching score selected from the plurality of actual template-image matching scores.

10. The method of claim 8 for operating a processor-controlled machine to decode a text line image wherein the stochastic finite state image network representing the text line image is implemented as a decoding trellis data structure.

11. The method of claim 8 for operating a processor-controlled machine to decode a text line image wherein the decoding operation uses a dynamic programming operation for computing the maximum cumulative path scores at all image positions except for the selected image positions in the text line image when the decoding operation computes the maximum cumulative path scores without using the dynamic programming operation by adding the score change value to the prior maximum cumulative path score.

12. The method of claim 8 for operating a processor-controlled machine to decode a text line image wherein each of the plurality of estimated template-image matching scores is an upper bound measurement of a match between an image region of the text line image and the character template associated with the directed branch.

13. The method of claim 8 for operating a processor-controlled machine to decode a text line image wherein the at least predetermined number of consecutive image positions in the text line image is greater than a maximum set width of a character template.

14. In an image recognition computer-implemented method for analyzing a bitmap text line image into a combination of character symbol templates selected from a library of templates on the basis of at least one complete path computed through a decoding trellis of a Markov source, the improvement comprising:

assigning an estimated match score to each transition in the decoding trellis according to a character template associated with the transition; the estimated match score for a character template being a substitute for an actual match score; the actual match score indicating a measurement of a match between an image region of the text line image and the character template associated with the transition;

performing a repeated sequence of a decoding operation followed by a re-scoring operation until a stopping condition is met; the decoding operation producing a complete path of nodes and transitions through the decoding trellis using the estimated match scores assigned to the transitions; the re-scoring operation assigning an actual match score to each transition in the complete path having an estimated match score; the actual match scores being available in the decoding trellis to subsequent iterations of the decoding operation;

the decoding operation producing the complete path by computing maximum cumulative path scores at every image position in the text line image; when a score change value between maximum cumulative path scores computed during production of a prior best path and maximum cumulative path scores computed during production of a current best path using the actual matching scores available in the decoding trellis is substantially constant for at least a predetermined number of consecutive image positions in the text line image, the decoding operation computing a maximum cumulative path score for an image position in the text line image by adding the score change value to a prior maximum cumulative path score while the score change value remains substantially constant.

15. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, while a skip mode switch is off, for each image position in the text line image, performing a first computing step of computing a maximum cumulative score indicating a measurement of a match between a sequence of character templates and an image region in the text line image from a starting location of the text line image to the image position;

performing a second computing step of computing a score change value between the maximum cumulative score and a prior maximum cumulative score computed at the image position; and comparing the score change value to a prior score change value and turning the skip mode switch on when the score change value is substantially constant for at least a predetermined number of consecutive image positions in the text line image;

the processor, further in executing the instructions, while the skip mode switch is on, for each image position in the text line image, performing a third computing step computing the maximum cumulative score by adding the score change value to a prior maximum cumulative score computed at the image position; and the processor, still further in executing the instructions, producing a transcription of the text line image using the maximum cumulative scores.

16. The article of manufacture of claim 15 wherein the processor, in executing the instructions, uses a dynamic programming operation to compute the maximum cumulative score when performing the first computing step of computing a maximum cumulative score; and wherein the processor, in executing the instructions, computes the maximum cumulative score by adding the score change value to the prior maximum cumulative score without using the dynamic programming operation when performing the third computing step of computing the maximum cumulative score.

* * * * *